United States Patent [19]

Wolf

[11] Patent Number: 5,636,682

[45] Date of Patent: Jun. 10, 1997

[54] CONTROL APPARATUS FOR A VEHICLE AIR TREATMENT INSTALLATION

[75] Inventor: Frank Wolf, Paris, France

[73] Assignee: Valeo Thermique Habitacle, Le Mesnil, France

[21] Appl. No.: 452,298

[22] Filed: May 26, 1995

[30] Foreign Application Priority Data

May 30, 1994 [FR] France .................... 94 06555

[51] Int. Cl.$^6$ .................................... F28F 9/04
[52] U.S. Cl. ................................................ 165/41
[58] Field of Search ........................................ 165/41

[56] References Cited

U.S. PATENT DOCUMENTS

| | | | |
|---|---|---|---|
| 4,118,615 | 10/1978 | Leibundgut | 200/157 |
| 4,447,859 | 5/1984 | Raczynski | 362/13 |
| 4,667,277 | 5/1987 | Hanchar . | |
| 4,854,045 | 8/1989 | Schaub | 30/155 |
| 4,873,614 | 10/1989 | Lichtensperger | 361/394 |
| 4,908,947 | 3/1990 | Schaub | 30/155 |
| 4,930,048 | 5/1990 | Kuniyasu . | |
| 4,985,806 | 1/1991 | Mazzullo et al. | 361/392 |
| 5,318,461 | 6/1994 | Frikkee et al. | 439/715 |
| 5,452,711 | 9/1995 | Gault | 128/200.14 |
| 5,455,566 | 10/1995 | Conway | 340/693 |

OTHER PUBLICATIONS

French Search Report dated Feb. 13, 1995.

*Primary Examiner*—Edward K. Look
*Assistant Examiner*—Mark Sgantzos
*Attorney, Agent, or Firm*—Morgan & Finnegan, L.L.P.

[57] ABSTRACT

A control apparatus for a heating and/or air conditioning installation, especially in a motor vehicle, which includes at least two modules, each of which is in the form of parallelepiped. Each module is arranged to contain at least one control member and has fastening means for fastening the modules together. A front plate is fitted on the from of the modules, and has at least one aperture through which at least one control member can pass, and/or which is adapted to carry a control knob. The fastening means consist of groves and matching ribs which extend centrally over the whole length of lateral faces of the modules. This enables a rib or groove of one module to be fit into a groove or rib, respectively, of another module.

12 Claims, 1 Drawing Sheet

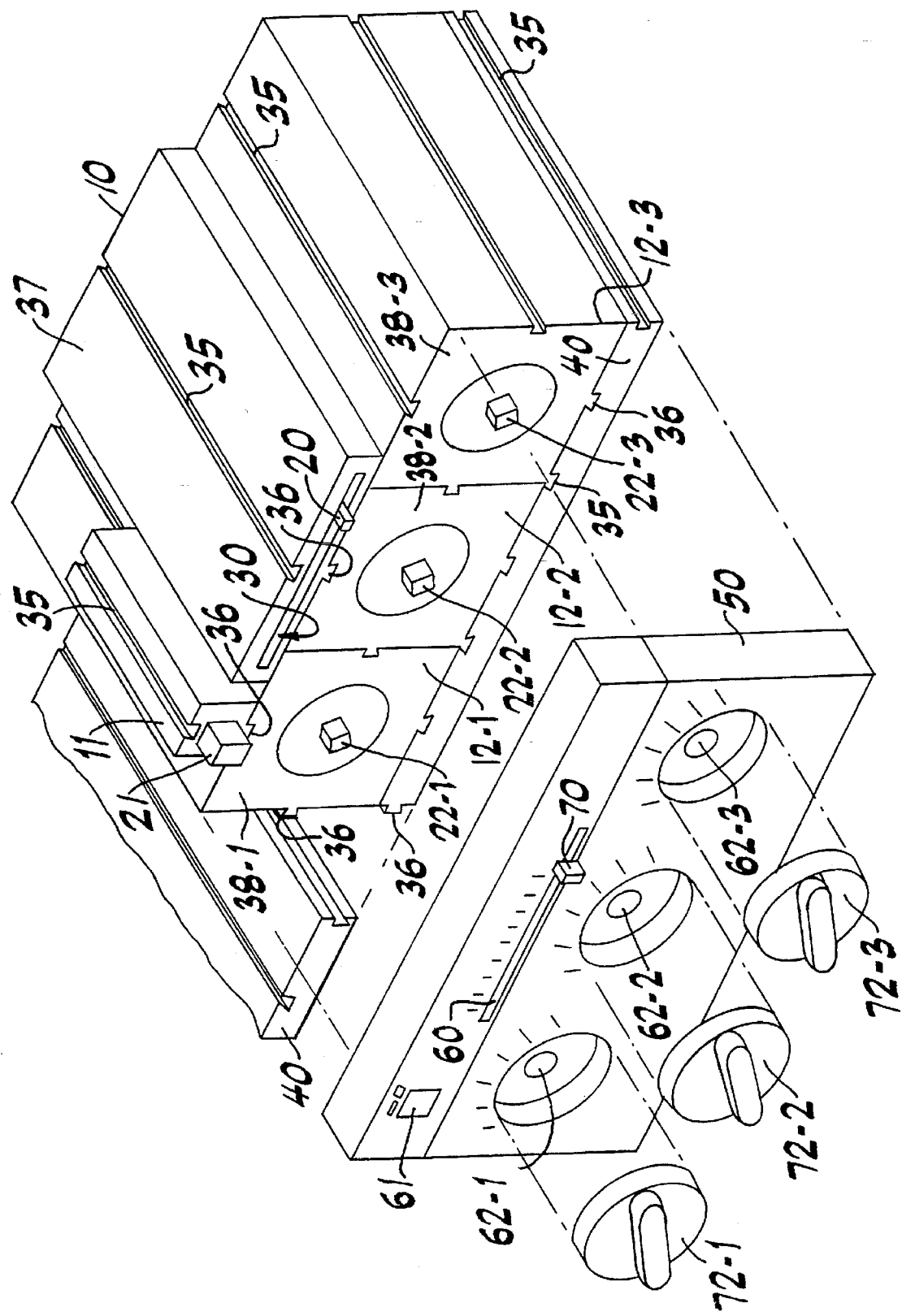

CONTROL APPARATUS FOR A VEHICLE AIR TREATMENT INSTALLATION

FIELD OF THE INVENTION

This invention relates to control apparatus for controlling a vehicle air treatment installation such as a heating and/or air conditioning installation, especially in a motor vehicle.

BACKGROUND OF THE INVENTION

A control apparatus of this type usually includes at least two control members for controlling various functions of the installation. In general, the apparatus has several control members, for adjusting, respectively, the temperature of the air delivered into the cabin of the vehicle, the speed of an air blower, and the distribution of the air through the various outlet vents arranged within the cabin. A member may also be provided for controlling the ratio between the flow of air from outside the vehicle and the flow of recirculated air, i.e. air which is drawn from within the cabin and then delivered back into the cabin after being treated. In addition, if the vehicle is equipped with an air conditioning option, an air conditioning control member is also provided.

These various control members generally consist of rotary knobs, or push buttons, or sliding cursor control knobs, with each type of button corresponding to a given function. Such control elements are of known, standardized types.

The number and type of control members fitted in the fascia of the vehicle depends of course on the number of options chosen. In consequence, the housing that contains the control members together with the associated circuits, which may be mechanical, pneumatic, electrical and/or electronic, is designed to suit the control members that are selected for a given model of vehicle.

It is also necessary to adapt the housing, firstly in accordance with the size of the fascia, and secondly having regard to the space available behind the latter. As a result, in current practice the housing for the control apparatus is specific to a given model of vehicle in most instances. Only rarely can it be used in a number of different models. This situation gives rise to substantial increases in selling price.

DISCUSSION OF THE INVENTION

A main object of the invention is to overcome the above drawback.

According to the invention, control apparatus for a heating and/or air conditioning installation in a vehicle, comprising at least two control members adapted to control the said installation, is characterised in that it comprises:

at least two modules, each defining a box shape in the form of a parallelepiped and each adapted to carry at least one control member;

fastening means adapted to fix the modules together; and a front plate having at least one aperture through which at least one control member can pass, and/or being adapted to receive a control knob.

Preferably, the fastening means comprise matching grooves and ribs which extend centrally over the whole length of the lateral faces of the modules.

According to a preferred feature of the invention, each module has at least two lateral faces formed with at least one groove or rib. In this way it is possible to fit a groove or a rib of one module to a rib or groove, respectively, of another module. This enables the modules to be assembled together to form a block or unit.

According to another preferred feature of the invention, the dimensions of each aperture in the front plate are substantially equal to, or slightly greater than, those of the control member with which the aperture is in facing relationship, with the control member extending through the aperture.

Preferably, in order to facilitate manipulation of the control members, the ends of some of them are adapted to receive a control knob. Then, once the installation has been installed in the vehicle, the control knobs lie at least partly on the front plate itself, which enables them to cooperate with appropriate indicia or markings on the exposed front surface of the front plate.

According to yet another preferred feature of the invention, the fastening means further include at least one mounting plate which is adapted to cooperate with the said modules so as to enable them to be fastened in a fascia panel.

Each mounting plate has four lateral faces, at least one of which preferably has at least one groove or matching rib. This enables a rib or groove of a mounting plate to be fitted to, respectively, a groove or rib of a module or another mounting plate.

The ribs and grooves are preferably of dovetail form. This enables the modules and the mounting plate to be secured together against movement in each of two dimensions in space.

Finally, according to a still further preferred feature of the invention, the dimensions of the front plate and mounting plate are chosen as a function of the number of modules, the form of the modules, and their disposition. It is also possible to make the front plates in any form whatsoever, in accordance with the space available or the visual appearance required.

In the description which follows, which is given by way of example only, reference is made to the accompanying drawing.

BRIEF DESCRIPTION OF THE DRAWING

The drawing shows a schematic view of the apparatus in one form in accordance with the invention.

DESCRIPTION OF A PREFERRED EMBODIMENT OF THE INVENTION

The apparatus consists of a number of different elements which are adapted to cooperate with each other so that they together constitute a control unit ready to be installed in a fascia panel or dashboard of a motor vehicle. The apparatus can be arranged for the control of numerous installations of any type in a motor vehicle. In the description that follows, the particular apparatus described is a modular control unit for controlling a heating and/or air conditioning installation for a motor vehicle.

The apparatus shown in the drawing comprises modular elements 10 to 12, each in the form of a parallelepiped having a front face and four lateral faces (i.e. a top face, a bottom face and two side faces). Each module 10 to 12 comprises a control member 20 to 22 which is connected, either to an electrical and/or electronic circuit (which is not shown in the drawing), or else to a mechanical and/or pneumatic device (again not shown in the drawing). The circuits and the mechanical device are provided with connections which enable them to be connected to the particular element of the installation which they are to control.

The dimensions of the modules vary in accordance with the function that they provide: in this connection, a mechanical or pneumatic control device generally requires a volume which is much greater than that called for by an electrical or electronic control device. In addition, a given control member corresponds to a given function to be controlled. As a consequence, the form of a control member also has an influence on the dimensions of its module, and in particular on its cross section.

The drawing shows three different types of module. The first type is represented by a single module 10 having a rectangular cross section. This module has a control member 20 of the cursor type which is adapted to be moved in a straight line within an aperture 30 in the form of a straight slot, formed in the front face of the module. In this configuration, the control member 20 adjusts the temperature of the cabin of the vehicle. The control member 20 is able to occupy a large number of positions corresponding to a range of temperature. It is generally connected to pneumatic, electrical and/or electronic circuits.

The second type of module is represented by a single module 11 of square cross section. This module 11 has a control member 21 which incorporates a manual control element in the form of a push button, and which has a generally square cross section. In this configuration the control member 21 starts or stops the flow of conditioned air. Accordingly, it works as an interruptor in an electrical and/or electronic circuit.

The third type of module is represented by three modules 12-1 to 12-3, each of which has a square cross section. Each of these modules 12-1 to 12-3 has a control member 22-1 to 22-3 respectively, these being of the rotary type projecting from a front face, 38-1 to 38-3 respectively, of the module. All of the modules 10 to 12 also of course have a rear face.

In this configuration, the control member 22-1 is used, for example, for the control of the speed of the air blower of the heating and air conditioning apparatus. It is able to be displaced from an intermediate position, either in the clockwise or in the anti-clockwise direction. In the clockwise direction, three positions are provided, all of which correspond to the delivery of cold air. In the anti-clockwise direction, there are three further positions, arranged symmetrically and corresponding to the delivery of hot air.

In this configuration again, the control member 22-2 serves for example for adjustment of the distribution of air into various positions of the cabin of the vehicle. It is arranged to be moved from an extreme position in the clockwise direction.

In the same configuration, the control member 22-3 provides, for example, control of the ratio between a stream of recirculated air coming from the cabin, and a stream of fresh air from outside the cabin, the mixed air stream thus obtained being then delivered into the cabin. The control member 22-3 is arranged to assume a number of positions, in which the proportions of the two air streams are preset.

The control members 22-2 and 22-3 may be connected to suitable mechanical devices which are adapted to position flap valves (not shown) for distribution of the air to be treated. The control member 22-1 is connected to electrical and/or electronic circuits.

The modules 10 and 11 are provided over the whole length of their four lateral faces with a groove 35 or a corresponding rib 36, whereby they are centred widthwise. These grooves and ribs are of dovetail form, and match each other. Preferably, each module 12 has two grooves 35 and two ribs 36, with one lateral face having a groove 35 while the opposite lateral face has a rib 36. In this way, a groove 35 of a first module 12-1 is able to fit over a rib 36 of a second module 12-2 so as to form a block of two modules joined together.

In the example of the assembly shown in the drawing, three modules 12-1 to 12-3 have been fitted together in a row, side by side, thus forming a control unit of rectangular cross section, but with the modules 10 and 11 mounted on top.

The modules 10 and 11 are provided, on two lateral faces which are all parallel to each other, with a groove 35 or a matching rib 36, identical with those of the modules 12-1 to 12-3. These are again centred on the corresponding faces of the module, and extend similarly over their whole length. In the module 10, the two lateral faces having a groove 35 or a rib 36 are those which are the widest, for example the face 37. This enables the module 10 to be fitted into the module 12-2, while minimising the volume occupied by the resulting assembly.

In the present example, the module 11 is fitted into the module 12-1. It could also be fitted into the module 12-3, or on to the module 10.

In order firstly to provide rigidity in the resulting control unit, and secondly to enable the latter to be fixed to a fascia panel, a mounting plate 40 is provided. This mounting plate 40 has, on its upper lateral face, a multiplicity of grooves 35 which are parallel to each other and equidistant from each other, being again of dovetail form and arranged to fit ribs 36 of the modules 10 to 12.

In this example, the distance separating two consecutive grooves 35 is equal to one half of the width of a lateral face of the module 12-1 to 12-3. Five grooves 35 are accordingly formed on the upper face of the mounting plate 40, which enables three modules 12-1 to 12-3 to be fitted on the latter by fitting the ribs of the modules into the grooves. One of the two side faces of the mounting plate 40 is also provided with a groove 35, while the other one has a rib 36. This enables the mounting plate 40 to be fitted into either one or two further mounting plates 40, or directly on to the fastening lugs of the fascia panel. In particular, the mounting plate 40 is fitted into a further mounting plate 40 either by fitting a rib on the side face of the latter into the groove 35 on the side of the former, or by fitting the rib 36 on the side face of the former into a groove on the side face of the latter. The dimensions of the mounting plate 40, and the number of grooves 35 or ribs 36 which it has, can easily be adapted according to the required assembly configuration of the modules 10 to 12.

An assembly is made up precisely according to two size criteria. The first of these criteria is linked with the size of the fascia panel, while the second is linked to the size of the rear of that fascia panel. Once the assembly of the modules 10 to 12 with the mounting plate has been carried out, a front plate 50 (or "facade") is fitted in front of this assembly. The front plate 50 is made of the same material as the fascia panel in which it is to be inserted. The front plate 50 is dimensioned according to the space available in the fascia panel for the control apparatus for the heating and air conditioning installation. It will be fixed either on to the modules 10 to 12, or directly into the fascia panel.

The front plate 50 has apertures 60 to 62, each of which enables a control member to pass through it. In this connection, the dimensions of each aperture are chosen according to the particular control member which lies facing it. In the example shown in the drawing, the aperture 60 has a shape which is rectangular, long and thin, being of substantially the same dimensions as the aperture 30 in the module 10. This enables the control member 20 to pass freely through it. By contrast, the aperture 60 is square, being of substantially the same size as (or slightly larger than) the push button 21 of the module 11.

The apertures 62-1 to 62-3 are substantially circular, which enables rotary control knobs 72-1 to 72-3 to be fitted in them. These control knobs are themselves circular, and of substantially equal size to (or smaller than) the apertures 62-1 to 62-3. The rotary control knobs 72-1 to 72-3 fit on the ends of the control members 22-1 to 22-3, which makes the latter easier to operate. A control knob 70, rectangular in shape, is also fitted on to the end of the control member 20, so as to facilitate handling of the latter. The knob 70 is carried in the slot 60 of the front plate.

The front plate 50 has suitable marking or indicia (not shown in the drawing) around its apertures 60 to 62, as appropriate for..each of the corresponding control members. These indicating zones are arranged either to mark the position of the control knob of the control member, or else to state the function of a control member when this has not already been done on its control knob or on its end.

The invention is of course not limited to the assembly described above by way of example and shown in the drawing. Thus, other geometries for the assembly of the modules can be envisaged, and in consequence any form of front plate whatever.

The control apparatus of the invention can have any desired configuration, according to the space available and/or according to aesthetic requirements. As a result, the invention is particularly well adapted to any design of control panel capable of being integrated into a fascia of a vehicle.

In addition, the number of control members mounted within a module can be greater than one, which will be the case if a common pneumatic, electrical and/or electronic circuit controls a plurality of devices in a common installation.

What is claimed is:

1. A control apparatus for controlling a vehicle air treatment installation, comprising a plurality of control members for controlling individual functions in said installation, a plurality of modules, each module including one of said control members and being of parallelepiped form so as to define a front face and four lateral faces of the module, fastening means for securing the modules together, a front plate mounted on the front faces of the modules, the front plate having a plurality of apertures, and a plurality manual control elements, each said manual control element being connected to a corresponding one of said control members through one of said apertures.

2. A control apparatus according to claim 1, wherein the fastening means are defined by the modules and comprise matching grooves and ribs which extend centrally along a whole length of one of said lateral faces of the module.

3. A control apparatus according to claim 2, wherein at least two lateral faces of each module define at least one element selected from a said groove and a said rib, whereby a rib of one module fits in a corresponding groove of another module and vice versa.

4. A control apparatus according to claim 1, wherein each control member is of a type selected from a rotary type, a push button type, and a cursor type.

5. A control apparatus according to claim 1, having at least one control member extending through one of said apertures in the front plate, wherein said aperture is at least substantially equal in size to the control member extending therethrough.

6. A control apparatus according to claim 1, wherein at least one of said manual control elements is a control knob, the corresponding control member having a projecting end portion on which said control knob is fitted.

7. A control apparatus according to claim 6, further including indicia on a front portion of the front plate associated with the control knob, the control knob lying at least partly on the front plate for cooperation with the indicia.

8. A control apparatus according to claim 1, wherein the fastening means further includes at least one mounting plate fastened to the modules.

9. A control apparatus according to claim 8, wherein the mounting plate has four lateral faces, each of said lateral faces having formed therein at least one fastening element selected from a groove and a matching rib, wherein one of said fastening elements of the mounting plate is fitted to a matching fastening element of one of said modules.

10. A control apparatus according to claim 2, wherein the grooves and ribs are of dovetail form.

11. A control apparatus according to claim 8, wherein the front plate and mounting plate are dimensioned according to a number, form and disposition of said modules.

12. A control apparatus according to claim 8, wherein the mounting plate has four lateral faces, each of said lateral faces having formed therein at least one fastening element selected from a groove and a matching rib, wherein one of said fastening elements of the mounting plate is fitted to a matching fastening element of a further mounting plate.

* * * * *